United States Patent
Siegel

[15] 3,693,531
[45] Sept. 26, 1972

[54] FLUID DISTRIBUTION APPARATUS PRESERVING ALIGNMENT OF LONGITDUINAL AXES OF FLOW

[72] Inventor: Matthew Siegel, 4051 Riverside Court, Fort Worth, Tex. 76109

[22] Filed: Nov. 29, 1971

[21] Appl. No.: 202,919

Related U.S. Application Data

[62] Division of Ser. No. 881,016, Dec. 1, 1969, Pat. No. 3,643,580.

[52] U.S. Cl. .................98/40 C, 98/40 D, 138/102, 248/58, 248/62, 285/177, 285/178, 285/DIG. 22
[51] Int. Cl. ...............................................F24f 7/00
[58] Field of Search .......98/40 C, 40 D, 32; 138/107, 138/DIG. 4; 248/58, 62; 285/177, 178, DIG. 22

[56] References Cited

UNITED STATES PATENTS

| | | | |
|---|---|---|---|
| 2,099,756 | 11/1937 | Seigle | 138/107 X |
| 2,354,155 | 7/1954 | Sternberg | 98/40 C |
| 2,799,518 | 7/1957 | Anderson et al. | 285/DIG. 22 |
| 2,857,108 | 10/1958 | Wallace | 98/40 C |
| 3,387,809 | 6/1968 | Zwerling | 138/107 X |

*Primary Examiner*—William F. O'Dea
*Assistant Examiner*—P. D. Ferguson
*Attorney*—Wofford and Felsman

[57] ABSTRACT

Apparatus for use in a fluid distribution system characterized by a combination hanger and coupling adapter having a coupling means with ends adapted to receive and support ends of ducts with their respective longitudinal axes being maintained in linear alignment so as to preserve the velocity component of a fluid flowing therethrough; and fastening means such as spring clips retained in each end of the coupling means and adapted to move outwardly to allow passage of the end of the ducts and to snap inwardly once the ends have passed, retaining the ducts in the coupling means. Great flexibility is attainable since one end of the coupling means may be smaller than the other and may be concentrically or eccentrically positioned to provide a vent means for general or directional distribution of a fluid flowing therethrough. The apparatus enable economical and rapid installation of a fluid distribution system, as well as low operating cost.

5 Claims, 10 Drawing Figures

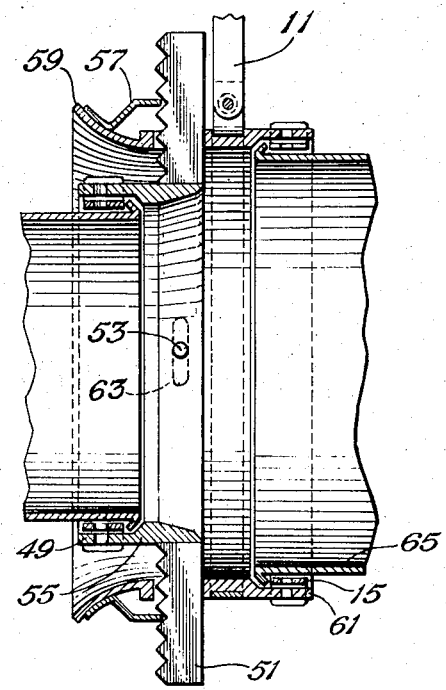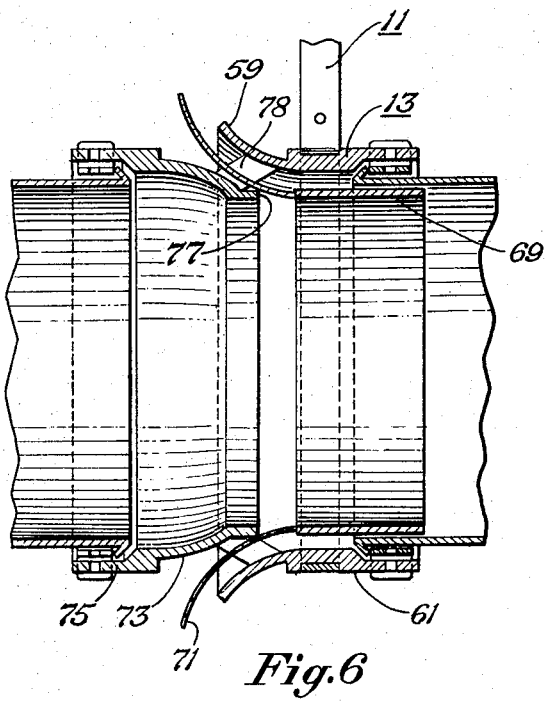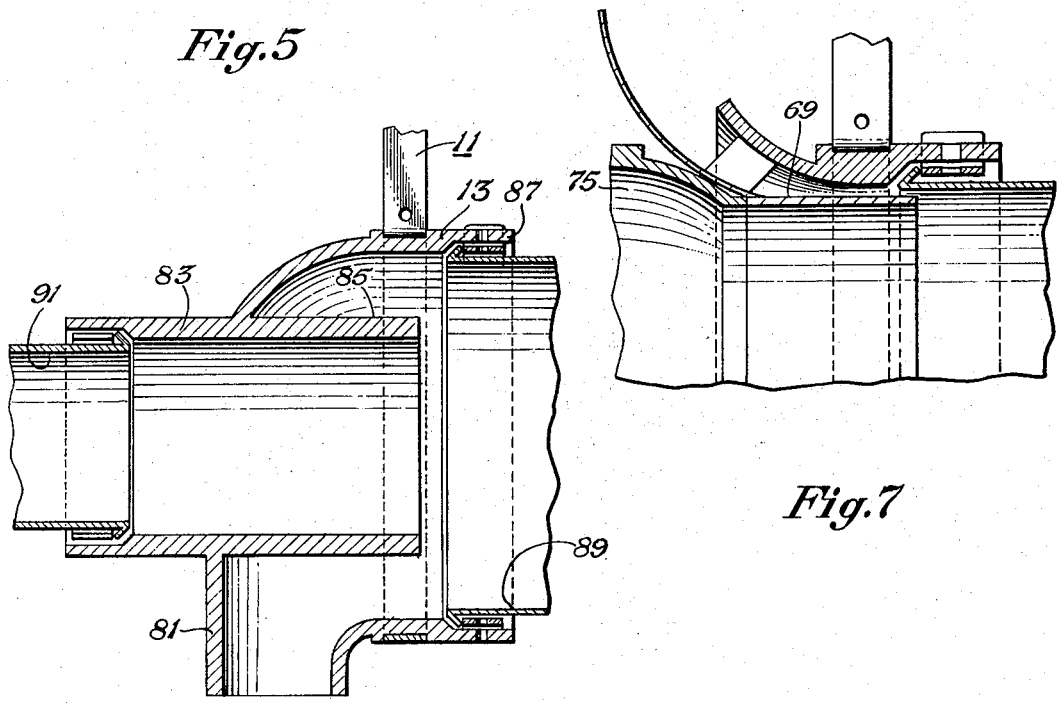

FLUID DISTRIBUTION APPARATUS PRESERVING ALIGNMENT OF LONGITDUINAL AXES OF FLOW

CROSS-REFERENCES TO RELATED APPLICATIONS

This is a division of application Ser. No. 881,016, filed Dec. 1, 1969, and now U.S. Pat. No. 3,643,580.

BACKGROUND OF THE INVENTION:

1. Field of the Invention

This invention relates to fluid distribution systems and, in a particular aspect, to apparatus for use in systems for distributing a fluid such as conditioned air in heating and in cooling buildings like industrial plants.

2. Description of the Prior Art

Fluid distribution systems such as systems for distributing conditioned air have seen a wide diversity of approaches. The prior art systems suffered from one or more of the following interrelated disadvantages.

1. In almost all the practical approaches it has been necessary for sheet metal workers to cut and form the conduit, or ducts, and other components of the system. This expensive labor by highly skilled workers made the initial costs fairly high for a conventional system.
2. The prior art systems did not maintain longitudinal axes of flow and thereby preserve the velocity component of the energy in the flowing fluid; but, ordinarily, had expansion and contraction joints in the duct with attendant large energy losses, or pressure drop, in the fluid flowing in the ducts due to such expansion and contraction joints; and, also, provided restricting ells or otherwise imposed physical blocks to obtain directional distribution of the fluid.
3. The prior art systems imposed directional louvers, grills, gate valves, and throat dividers, or dampers; thereby producing a relatively high noise level that necessitated a low velocity of flow of the fluid to keep the noise low enough to be comfortable.
4. These systems had large energy losses that necessitated relatively large differential pressures between different parts of the fluid distribution system. The prior art systems, to try to obviate the disadvantages enumerated hereinbefore, employed relatively large ducts that supported the accessories and hence, required high structural strength to support themselves and their accessories.
5. The prior art systems, as indicated above, had relatively large energy losses that required relatively large continued operating costs and resulted in low efficiency.
6. The prior art systems were difficultly alterable because emplaced between floor and ceiling, or in other restricted areas.
7. The prior art systems were restricted, generally, to gases or the like.
8. The prior art systems were designed for either suction or discharge distribution systems and not readily convertible to the other.

BRIEF DESCRIPTION OF THE DRAWINGS

FIG. 5 is a partial cross sectional view of another embodiment of this invention in which a smaller end of a coupling means is adjustably positioned within a larger end of a coupling means.

FIG. 6 is a partial cross sectional view of one embodiment of this invention having a flow control therein and effecting a radial distribution of air; and FIG. 7 is an enlarged partial cross sectional view of one side of the embodiment of FIG. 6 with the flow control closed.

FIG. 8 is a partial cross sectional view of another embodiment of this invention effecting distribution of air 90° to the longitudinal axis of the coupling means.

DESCRIPTION OF PREFERRED EMBODIMENTS

It is a primary object of this invention to obviate the disadvantages of the prior art systems employed in effecting distribution of fluids and to provide a system having the advantages delineated hereinafter.

Figure 1:
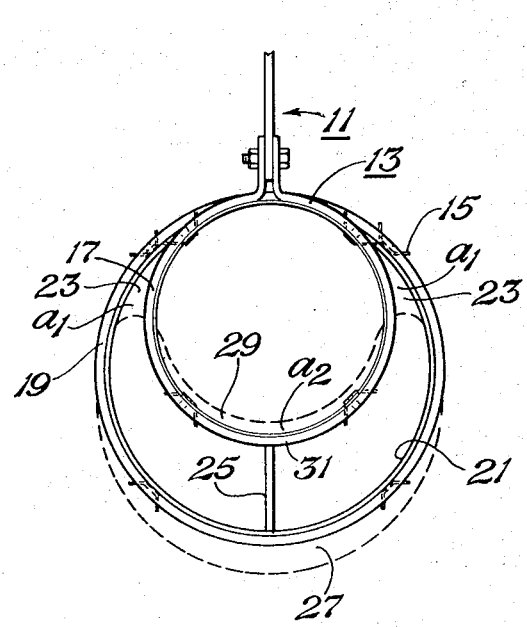
FIG. 1 is a front elevational view of one embodiment of this invention.
Figure 1A:
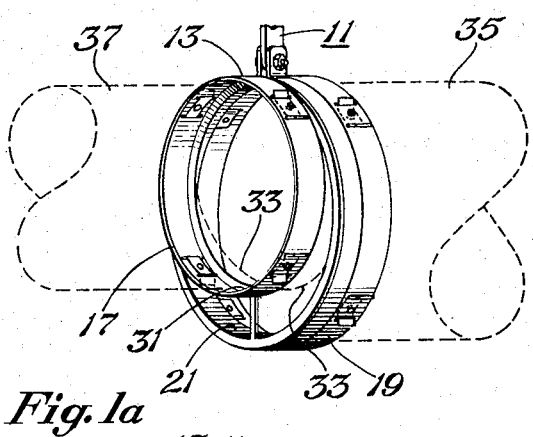
FIG. 1a is an isometric view of the embodiment of FIG. 1 without embellishment.

Referring to FIG. 1, there is illustrated a mounting bracket 11 supporting coupling means 13 having fastening means 15 retained in each of its ends. As can be seen in FIG. 1a, coupling means 13, suspended from mounting bracket 11, has ends that are adapted to receive and that support respective ends of ducts, shown in ghost lines, with the respective longitudinal axes of the ends of the coupling means; and, consequently, the ducts positioned therein; being maintained in linear alignment so as to preserve the velocity component of the energy of a fluid flowing therethrough.

If desired, the coupling means may have respective ends that are the same size in which event the combination serves as a hanger and coupling adapter. The embodiments of the invention having the greatest advantages are those wherein one end of the coupling means is smaller than the other end and the invention is described in most detail with regard to the latter embodiment.

Figure 1B:
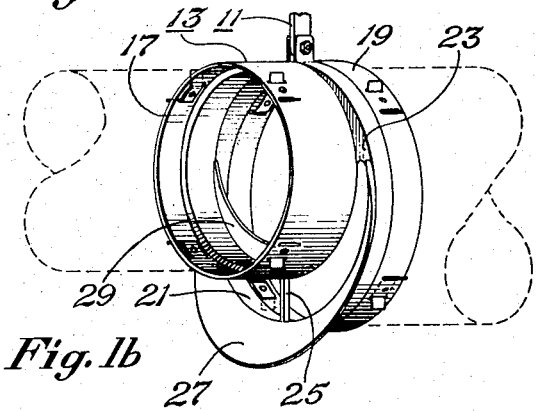
FIG. 1b is an isometric view of the embodiment of FIG. 1 with fillup and nozzle embellishments.

As illustrated in FIGS. 1, 1a, and 1b, one end 17 of coupling means 13 is smaller than the other end 19 and a vent 21 is thereby provided. The smaller end 17 is eccentrically positioned with respect to the other end 19. Smaller end 17 is contiguous with larger end 19 at the point of eccentricity and is connected therewith by suitable means. The smaller end may be connected with the larger end at the point of eccentricity by being welded thereto if they are fabricated separately, or by being integrally cast or molded together. If the two ends are integrally cast or molded together, greater structural strength is realized if fillups 23 and brace 25, FIGS. 1 and 1b, are provided.

Figure 2:
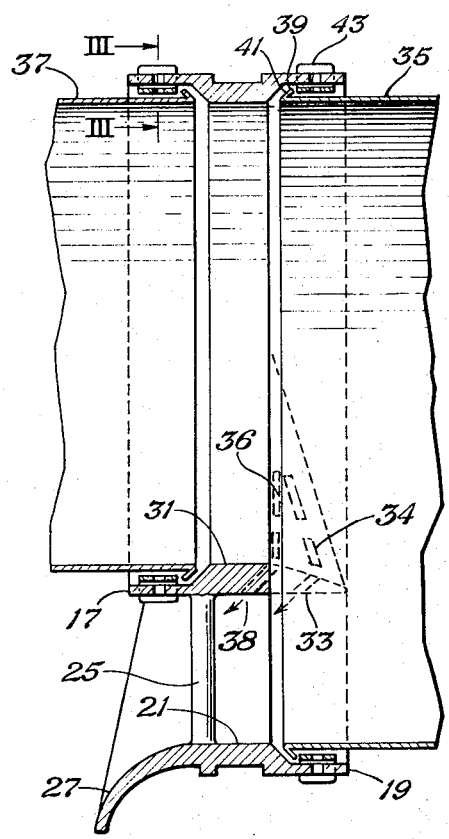
FIG. 2 is a side cross sectional view of one embodiment of this invention.

Better directional distribution of a fluid flowing through vent 21 is effected by a nozzle 27, FIGS. 1b and 2, outside the ends of coupling means 13. Nozzle 27 may be of any size but should be large enough to smooth the distribution of fluid in a desired direction. Fillups 23 also improve the directional distribution of a fluid flowing out vent 21.

Fillups 23 each have an area $a_1$ which blocks the flow of a fluid flowing out the area adjacent the side of eccentricity which would otherwise be a turbulent region of vent 21. It may be desirable to restore the area balance by imposing a baffle 29; FIG. 1b and dashed lines in FIG. 1, having an area $a_2$ substantially equal to $2a_1$; on the opposite side 31 of the smaller end 17 and adjacent nozzle 27. Such a combination effects a smooth flow of fluid through smaller end 17 and out vent 21.

On the other hand, if desired, smaller end 17 may have an inward protrusion 33, dashed lines, FIGS. 1a, and 2, extending within larger end 19 for smooth flow characteristics. Inward protrusion 33 is located on side 31 diametrically opposite the side of eccentricity. Inward protrusion 33 is shown in dashed lines since it is optional.

Also shown by dashed lines in FIG. 2 are a series of slots 34 and 36. Slots 34 and 36 are arranged around the periphery of smaller end 17 to effect flow of fluid therethrough, as indicated by arrows 38. In this way, the fluid flowing through slots 34 and 36 breaks up the boundary layer adjacent the exterior of smaller end 17 in vent 21. This breaking up of the boundary layer improves the directional distribution of air flowing out nozzle 27.

Slots 34 and 36 are arranged in respective arcuate geometric patterns so as to serve as a sort of perforation along which portions of inward protrusion 33 may be severed if shortening of inward protrusion 33 is desired.

Coupling means 13 is rotatable with respect to mounting bracket 11 and one or more ducts inserted in the ends of the coupling means. For example, as illustrated, coupling means 13 may be rotated about the end of duct 35 to place vent 21 where it is needed to achieve the desired distribution of air from vent 21. As illustrated, the coupling means, mounting bracket, and ducts are circular in cross section so that the coupling means is universally rotatable to achieve any degree of positioning of vent 21. For example, vent 21 may be placed adjacent mounting bracket 11, at 90°, at 270° or at any other angle with respect thereto. Duct 37 having its end in the smaller end 17 of coupling means 13 may be raised or lowered depending upon the change of the position of vent 21 as coupling means 13 is rotated about duct 35 and within mounting bracket 11. The other end of duct 37 may be similarly raised or lowered to retain exact axial alignment if desired. On the other hand, fastening means 15 allow enough play that it is not ordinarily necessary to raise or lower the other end of duct 37 as coupling means 13 is rotated.

Figure 3:
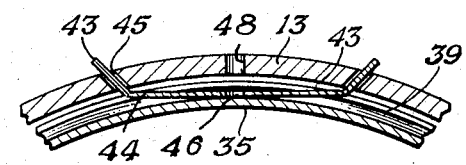
FIG. 3 is a partial cross sectional view showing a fastening means after a duct has been snapped into position in accordance with one embodiment of this invention.

As can be seen in FIG. 2, the respective ends of ducts 35 and 37 have a protruding shoulder portion 39 defining an inclined section 41 adapted for forcing spring clip 43, serving as fastening means 15, outwardly through its retaining apertures 45, FIG. 3, when the respective end is inserted and snapped into position within coupling means 13. While the figures are not to scale, the shoulder portions of the ends of the ducts pass through the respective ends of coupling means 13 inside spring clips 43. Spring clip 43 has a lineal section 44 that may be forced toward the outside of the respective end walls of coupling means 13 by inclined section 41, but is adapted to spring inwardly behind the shoulder portion of the end of the duct to retain the duct in coupling means 13 and to serve as a bearing means which can be rotated with respect to the duct.

An aperture 46 is provided in the mid region of lineal section 44 for insertion of a releasing tool. The releasing tool may be inserted through apertures 48 in the respective ends of coupling means 13 to engage apertures 46 and pull sections 44 to the respective walls for allowing withdrawing of the end of the duct. A plurality of releasing tools, one for each spring around the periphery of the respective ends, may be employed to retain lineal sections 44 of the spring clips against the walls of the respective ends and allow the ends of the ducts to be withdrawn. Thus, each of the spring clips 43 are pulled to their outermost position by respective releasing tools and allow shoulder portion 39 to be pulled from its respective end. Any device that can be inserted within aperture 46 and 48 to hold lineal portion 44 against the walls of coupling means 13 may be employed as the releasing tool. The spring clips may also be forced outwardly by appropriate shims inserted under section 44 along the longitudinal axis of the duct.

On the end of the duct, inclined section 41 is a frustro-conical section when the duct end is circular in cross section. Spring clip 43 is adapted to snap back into position inside shoulder portion 39 and retain the respective ducts within coupling means 13. Ordinarily, spring clips 43 are employed in pairs diametrically opposing each other. Preferably, at least four spring clips are employed about the periphery of the respective ends of coupling means 13 to adequately retain the ducts therewithin. The four spring clips may be spaced equally about the periphery of the respective ends. When large ducts are employed it is advisable to employ more than four spring clips. For example, six or even eight or more spring clips may be employed, ordinarily spaced equally about the periphery of the ends of coupling means 13. Thus, the respective ends of adjacent ducts can be snapped, or pressed, into position in the respective end of the coupling means and will be held by the spring clips; enabling rapidly assembling the ducts to form a distribution system for the flow of a fluid therethrough, as illustrated schematically in FIG. 4. For example, additional ducts may be snapped into position in additional coupling means 13 supported on additional mounting brackets 11 to obtain the desired distribution of conditioned air without the expense of elaborate expansion and contraction duct work, grills, directional louvers, butterfly valves, throat dividers, or dampers.

While the "adapter-vent" of the invention has been described hereinbefore with respect to an eccentrically mounted smaller end of the coupling means, other forms may be employed to fulfill the needs of any fluid distribution system. For example, the smaller end may be positioned with any degree of eccentricity ranging from a completely eccentric smaller end to a concentrically mounted smaller end. Moreover, if desired, the smaller end may be adjustably mounted, as illustrated in FIG. 5, to effect an adjustable degree of eccentricity. In FIG. 5 small end 49 is mounted on a positioning means; such as rack, or notched bar, 51 and rod 53. Rack 51 and rod 53 may extend transversely across smaller end 49 but less interference with flow is realized if they are affixed to the peripheral framework 55 and do not extend across the interior of smaller end 49. Rack 51 is retained at a given position by catch 57 affixed to nozzle 59 forming an extension of larger end 61.

Thus, smaller end 49 may be completely eccentric at the top or the bottom of larger end 61 and retained in this position by catches 57. Since coupling means 13 is also rotatable, any position of eccentricity can be effected. Rod 53 slides in slot 63 through the peripheral wall of larger end 61. Rod 53 thereby helps in maintaining axial alignment of ducts 65 and 67. The remainder of the elements such as mounting bracket 11, fastening means 15 and the ends of the respective ducts are formed as described hereinbefore.

Thus, it can be seen that a high degree of flexibility is afforded wherein the nozzle 59 may effect distribution of air at 360° around smaller end 49 or may effect a directional distribution caused by a completely eccentric arrangement, or any degree of fluid distribution therebetween; such as might be effected with any desired degree of eccentricity from completely eccentric to concentric.

If a concentric arrangement is desired, the smaller end 49 may be fixedly mounted concentrically within larger end 61 to thereby provide a vent for effecting distribution of a fluid flowing therethrough at 360° around the longitudinal axis of the ends of the coupling means and any ducts therein. Expressed otherwise, rack 51 and rod 53 are replaced by permanent braces, or supports, instead of being adjustable to effect such a concentric arrangement.

FIG. 6 illustrates a concentric arrangement similar to FIG. 5 in that it has a nozzle 59 extending 360° around the smaller end for similarly effecting the distribution of a fluid flowing therethrough at 360° around the longitudinal axis of the ends of the coupling means. The ducts on both sides of the coupling means of an embodiment such as illustrated in FIG. 6 may be the same diameter. If desired, the downstream duct may have a smaller diameter, since otherwise a slower velocity will result when the fluid is passed out nozzle 59. In addition, a flow control 69 is provided. Flow control 69 comprises a thin cylinder fitted closely to the peripheral wall of coupling means 13 so as to provide minimal interference with flow of a fluid therepast. Flow control 69 has a handle, and preferably, at least a pair of handles, 71 protruding outside the coupling means. Handles 71 are employed to slide flow control 69 along the longitudinal axis of the larger end 61 of the coupling means to effect a desired rate of flow of fluid flowing therepast and out the vent formed between nozzle 59 and the interior structure 73 of smaller end 75. As illustrated, the interior structure has a lip 77 that will conformingly engage the inner edge of flow control 69 to prevent further flow of fluid out nozzle 59 when the flow control is moved into the closed position. FIG. 7 is an enlarged partial cross sectional view showing the flow control 69 in the closed position, constraining the fluid to flow into smaller end 75. Braces 78 retain the respective relationship between the sections of coupling means 13.

FIG. 8 illustrates an embodiment wherein a nozzle 81 extends transversely to the longitudinal axis of coupling means 13 and any ducts associated therewith for effecting a distribution of a fluid flowing therethrough at an angle of 90° to the longitudinal axis. If desired, the nozzle may be employed without any interior intruding portion. However, flow characteristics are better preserved, and particularly, better linear flow is effected in the fluid flowing out smaller end 83 when smaller end 83 has an intruding portion 85 extending into the nozzle portion toward the other end 87 of coupling means 13. Expressed otherwise, intruding portion 85 comprises a generally cylindrical section having the same diameter as smaller end 83 and extending into larger end 87 for better preserving the velocity component of a fluid flowing therethrough. Nozzle 81 may be directed in any direction by rotating coupling means 13 within mounting bracket 11 and about respective ducts 89 and 91. Preferably, nozzle 81 does not constrict the area through which the fluid can flow. Smaller end 83 may be concentric with respect to larger end 87, if desired. Smaller end 83 is also preferably shorter than illustrated. FIG. 8 is not drawn to scale and duct 91 is received adjacent nozzle 81 without appreciable length of end 83 therebetween.

Figure 4:
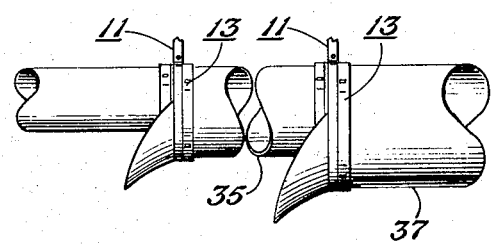
FIG. 4 is a simplified partial side elevational view of one embodiment of this invention.

In operation, as indicated hereinbefore in connection with the FIGS. and particularly FIG. 4, coupling means 13 may be emplaced in mounting bracket 11 suspended at appropriate points from the ceiling or other suitable structural support. Thereafter, the respective ducts are emplaced by simply pressing the ends within the respective ends of the coupling means. The fastening means such as the spring clips 43 are pressed outwardly and snapped inwardly to retain the ends of the ducts in place. All of the respective vents and nozzles will have been preformed into the coupling means and, consequently, the system is rapidly and economically installed.

While the invention has been described hereinbefore with respect to circular ducts, the same principle holds for ducts of other shape. For example, whereas the rotation of circular ducts may be universal to effect any desired degree of positioning of a vent, a square duct may be rotated in increments of 90° with respect to the same mounting bracket 11 and square ducts inserted within the respective ends. On the other hand, triangular ducts may be similarly rotated in increments of 120°.

The fluid distribution system has been described with respect to nozzles, coupling means, and ducts of circular cross section, but the same general distribution pattern may be effected with square or triangular shaped ducts.

As indicated hereinbefore, the combination hanger and coupling adapters, with or without vents, may be made of any material having the requisite structural strength. For example, they may be made of metal, either wrought, cast, stamped, or otherwise formed into the desired shape; plastic, either molded, cast, or otherwise formed into the desired shape; or any other material suitable for the fluid to be distributed and the environment in which the distribution system will be employed. The respective braces may be cohered to the contiguous elements as by welding or otherwise fusing thereto; they may be adhered as by the new high-strength glues like epoxy resin; or they may be otherwise fastened as by bolts or screws.

Since the combination hanger and coupling adapter have the structural strength, the structural requirements of the ducts are much less. Accordingly, the ducts may be made of much thinner material and may be made from much more diverse materials that were heretofore inadequate to meet the demands of fluid distribution systems.

From the foregoing it can be seen that the invention provides structure that enables construction of a fluid distribution system that has the following advantages over prior art systems.

1. The components of the apparatus of this invention are preformed employing economical mass production techniques and may be readily assembled into a fluid distribution system by relatively unskilled labor; thereby making initial cost at least 50 percent less than that of a conventional system.
2. The apparatus of this invention maintains longitudinal alignment of ducts, preserving the velocity component of the energy of fluids flowing therethrough, and it avoids contraction and expansion losses within the distribution system.
3. Since the noise level is the limiting factor in the velocities that can be employed and since the noise level was raised appreciably by the louvers and vents conventionally employed, the apparatus of this invention enables the use of velocities at least twice as high as has been conventionally employable with no greater noise level, further reducing duct sizes and increasing other interrelated advantages.
4. The invention enables maintaining more nearly uniform pressure throughout the distribution system, since it avoids large energy losses such as the pressure drops accompanying contraction and expansion losses within the distribution system.
5. It also reduces the size of ducts required and, because the structural supports are provided by the combination hanger and coupling adapter, it also reduces the structural requirements of the ducts.
6. Because of the reduced friction and the preservation of a higher portion of the energy of the flowing fluid, the apparatus of this invention maintains a high efficiency of operation.
7. The invention has at least as great a flexibility as any of the prior art systems and provides a system that can be employed in an open area and can be employed in conjunction with any desired prior art apparatus, facilitating altering an installation or adding on to an existing system.
8. The apparatus of this invention can be employed with any fluid or material exhibiting fluid-like flow behavior.
9. The apparatus of this invention may be employed in either or both suction and discharge distribution systems.

Although the invention has been described with a certain degree of particularity, it is understood that the present disclosure has been made only by way of example and that numerous changes in the details of construction and the combination and arrangement of parts may be resorted to without departing from the spirit and the scope of the invention.

I claim:

1. A combination hanger and coupling adapter comprising:
    a. a mounting bracket adapted for supporting a coupling means; said mounting bracket having a cross sectional shape that is a regular geometric figure so as to allow rotation of a coupling means therewithin;
    b. a coupling means for coupling ends of ducts, said coupling means having ends adapted to receive and support respective ends of ducts with the respective longitudinal axes of said ends of said coupling means and, consequently, any ducts positioned therewithin, being maintained in substantially linear alignment so as to preserve the velocity component of the energy of a fluid flowing therethrough; one end thereof being smaller than the other end thereof so as to define a vent therebetween; said vent effecting distribution of a fluid flowing therethrough at 360° around said longitudinal axes of said ends of said coupling means and any ducts therein; said coupling means having a cross sectional shape that is said regular geometric figure and rotatably and conformingly fitting within said mounting bracket so as to enable emplacing said vent at any position about the longitudinal axis of said mounting bracket; and
    c. fastening means retained in each end of said coupling means and adapted to be moved outwardly to allow passage of said ends of said ducts and to snap inwardly once said ends of said ducts have passed for retaining said ducts in the respective ends of said coupling means;

whereby, said ducts can be snapped into place and supported without special tools and rapidly effect a complete fluid distribution system in which said vents can be positioned by rotating said coupling means in said mounting bracket for achieving the desired air distribution.

2. The combination of claim 1 wherein said vent has a nozzle outside said ends of said coupling means for effecting distribution of a fluid flowing therethrough, and said nozzle extends 360° around said one end that is smaller for effecting a distribution of a fluid flowing therethrough at 360° around said longitudinal axes of said ends of said coupling means.

3. The combination of claim 2 wherein a flow control is provided, said flow control comprising a thin cylinder fitted closely to the peripheral wall of said coupling means so as to provide minimal interference with the flow of a fluid therepast, having a handle protruding outside said coupling means, and being positionable along said longitudinal axis of said ends of said coupling means to effect the desired rate of flow of a fluid flowing therepast and out said vent.

4. The combination of claim 1 wherein said one end that is smaller is mounted on a positioning means that is adjustably retained in said other end.

5. A combination hanger and coupling adapter comprising:
    a. a mounting bracket adapted for supporting a coupling means; said mounting bracket having a cross sectional shape that is a regular geometric figure so as to allow rotation of a coupling means therewithin;

b. a coupling means for coupling ends of ducts, said coupling means having ends adapted to receive and support respective ends of ducts with the respective longitudinal axes of said ends of said coupling means and, consequently, any ducts positioned therewithin, being maintained in substantially linear alignment so as to preserve the velocity component of the energy of a fluid flowing therethrough; one end thereof being smaller than the other end thereof so as to define a vent therebetween; a nozzle disposed about said vent, said nozzle extending transversely to said longitudinal axis for effecting a distribution of a fluid flowing therethrough at an angle of 90° to said longitudinal axis; said one end that is smaller having an intruding portion extending into said nozzle toward said other end of said coupling means for preserving said velocity component of a fluid flowing therethrough; said coupling means having a cross sectional shape that is said regular geometric figure and rotatably and conformingly fitting within said mounting bracket so as to enable emplacing said vent at any position about the longitudinal axis of said mounting bracket; and c. fastening means retained in each end of said coupling means and adapted to be moved outwardly to allow passage of said ends of said ducts and to snap inwardly once said ends of said ducts have passed for retaining said ducts in the respective ends of said coupling means;

whereby, said ducts can be snapped into place and supported without special tools and rapidly effect a complete fluid distribution system in which said vents can be positioned by rotating said coupling means in said mounting bracket for achieving the desired air distribution.

* * * * *